(12) United States Patent
Shin

(10) Patent No.: US 6,415,042 B1
(45) Date of Patent: Jul. 2, 2002

(54) DIGITAL IMAGE CODING/DECODING APPARATUS AND METHOD FOR EVALUATING THE QUALITY OF IMAGES TRANSMITTED USING WATERMARKING

(75) Inventor: Hyun-doo Shin, Kyungki-do (KR)

(73) Assignee: Samsung Electronics Co. Ltd., Kyungki-Do (KR)

(*) Notice: Subject to any disclaimer, the term of this patent is extended or adjusted under 35 U.S.C. 154(b) by 0 days.

(21) Appl. No.: 09/345,834

(22) Filed: Jul. 1, 1999

Related U.S. Application Data

(60) Provisional application No. 60/091,541, filed on Jul. 1, 1998.

(51) Int. Cl.[7] ................................................ G06K 9/00
(52) U.S. Cl. ...................... 382/100; 348/408.1; 382/232
(58) Field of Search ................................ 382/100, 128, 382/232–255, 275–277; 324/309; 345/421; 358/432; 375/240.11; 600/437; 348/407, 1, 421.1, 408.1

(56) References Cited

U.S. PATENT DOCUMENTS

| | | | | |
|---|---|---|---|---|
| 5,461,423 A | * | 10/1995 | Tsukagoshi | 348/416 |
| 5,495,292 A | * | 2/1996 | Zhang et al. | 348/407 |
| 5,561,464 A | * | 10/1996 | Park | 348/397 |
| 5,619,998 A | * | 4/1997 | Abdel-Malek et al. | 128/666.07 |
| 5,838,823 A | * | 11/1998 | Ancessi | 382/232 |
| 5,880,856 A | * | 3/1999 | Ferriere | 358/432 |
| 6,014,468 A | * | 1/2000 | McCarthy et al. | 382/254 |
| 6,134,350 A | * | 10/2000 | Beck | 382/240 |

* cited by examiner

Primary Examiner—Jayanti K. Patel
(74) Attorney, Agent, or Firm—Sughrue Mion, PLLC

(57) ABSTRACT

Digital image coding/decoding apparatus using watermarking, and methods thereof are provided. The digital image coding apparatus includes a first discrete wavelet transform portion for receiving a host image to be transmitted and performing discrete wavelet transform thereon, thereby outputting M×M discrete wavelet coefficients where M is a predetermined positive integer, an original signature image storage portion for storing an image suitable to an analysis of variance (ANOVA) technique as an original signature image, a second discrete wavelet transform portion for receiving the original signature image and performing discrete wavelet transform thereon to obtain N×N wavelet coefficients, N being another predetermined integer smaller than M, and a coefficient replacement/combination portion for replacing and combining N×N location data with N×N wavelet coefficients selected among M×M wavelet coefficients in accordance with a predetermined rule to then output the N×N location data and replaced M×M wavelet coefficients. A small amount of the image samples are transmitted in confidence as a signature image using watermarking, without affecting the original images. Then, during decoding, an ANOVA technique is applied to the restored signature image and the original signature image, thereby accurately predicting the quality of the host image.

17 Claims, 4 Drawing Sheets

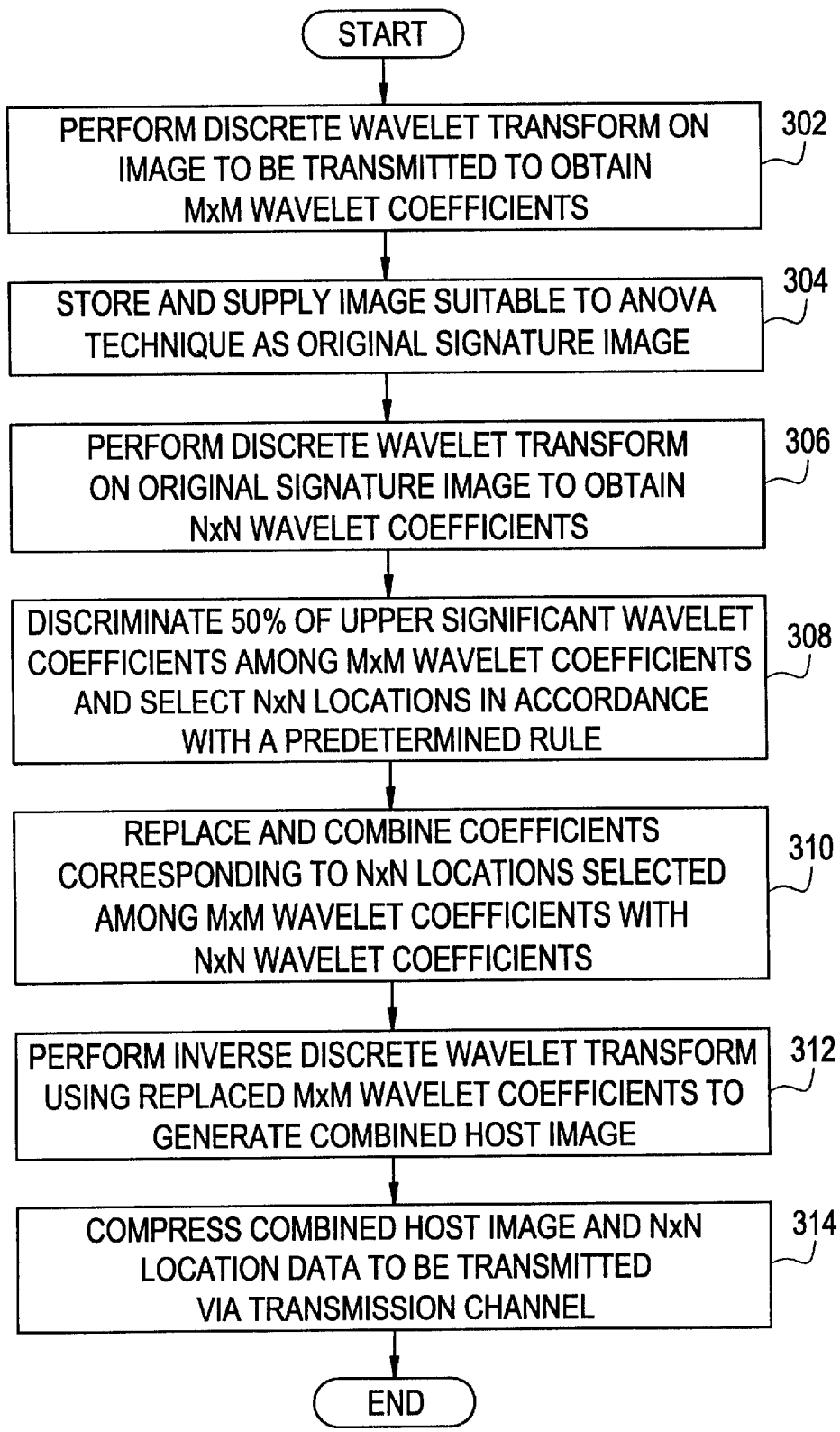

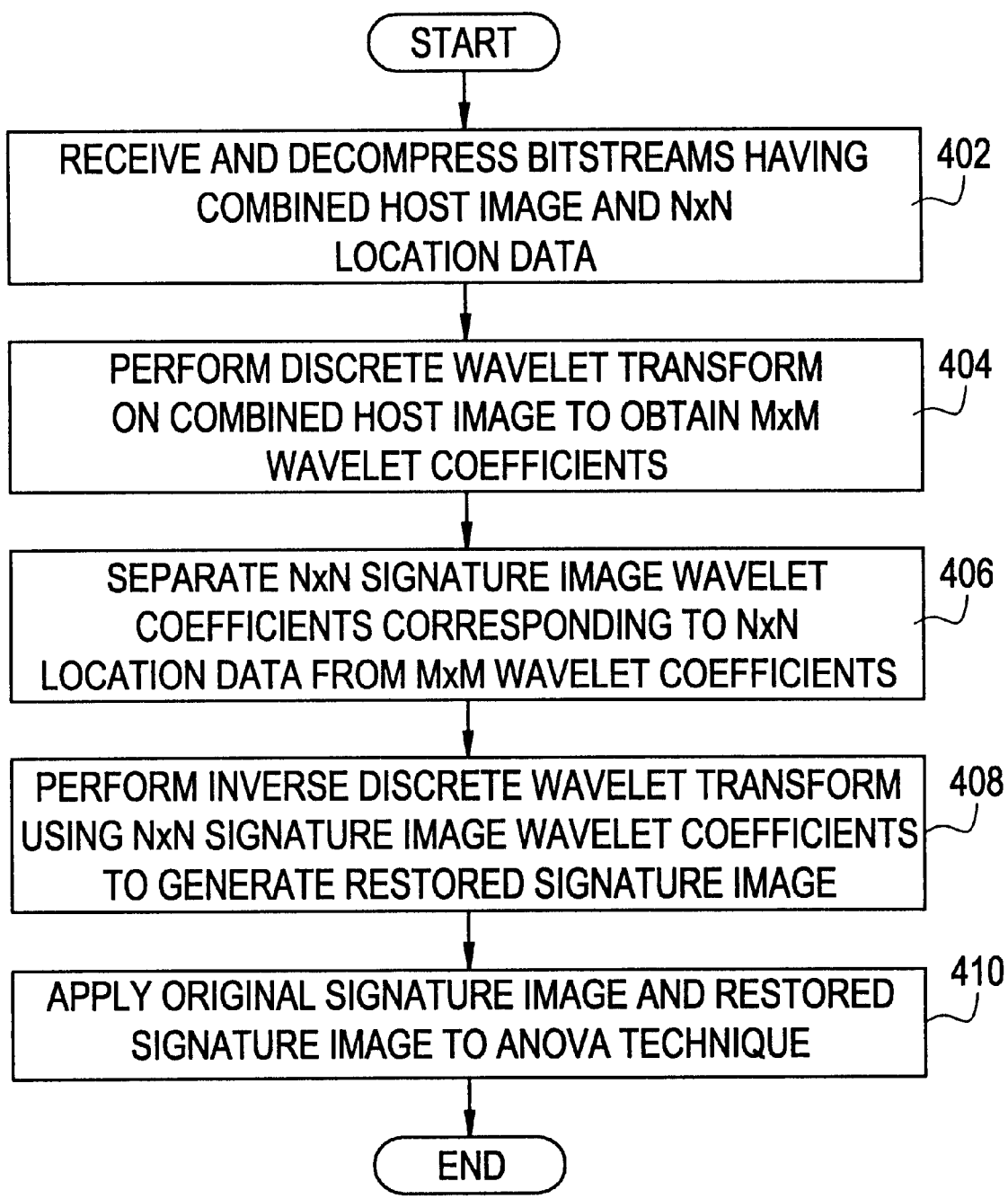

DIGITAL IMAGE CODING/DECODING APPARATUS AND METHOD FOR EVALUATING THE QUALITY OF IMAGES TRANSMITTED USING WATERMARKING

RELATED APPLICATION DATA

This application claims the benefit of the provisional patent application entitled "Method and Apparatus for Reproducing Signature Image in Watermarked Image", U.S. Ser. No. 60/091,541, filed by the applicant of the present invention on Jul. 1, 1998. The content of the provisional patent application is incorporated herein by reference.

BACKGROUND OF THE INVENTION

1. Field of the Invention

The present invention relates to a digital image coding apparatus using watermarking, a decoding apparatus, and coding and decoding methods, and more particularly, to a digital image encoding apparatus for inserting an original signature image into a significant area of a host image during encoding, evaluating variance between the host image and the original signature image during decoding, thereby precisely estimating the quality of the host image, a corresponding decoding apparatus, and corresponding encoding and decoding methods.

2. Description of the Related Art

Watermarking is a technology in which an image to be transmitted is transmitted together with an encrypted image for the purpose of providing security and authentication rights. A receiver side receives the image to be transmitted (hereinafter to be referred to as a host image) together with the encryption image transmitted with confidence (hereinafter to be referred to as a signature image). The signature image is decoded by a special decryption apparatus.

FIG. 1 is a conceptual block diagram illustrating a conventional digital image codec apparatus 1 for generating a watermarked image 8 and extracting a signature image 14 from the watermarked image. In the conventional digital image codec apparatus, during encoding, a DCT (Discrete Cosine Transform) 2 is performed on a host image 3 and a secret signature image 4 to be transmitted, thereby extracting DCT coefficients for the respective images. The DCT coefficients are encoded by an encoder 5. Here, the DCT coefficient components of the signature image 4 are encoded by a separate encryption encoder 6 that controls the encryption operation. In such a manner, the DCT coefficients of the host image 3 and the DCT coefficients of the signature image 4 inserted into the DCT coefficients of the host image 3 after being encoded, can be transmitted. An IDCT (Inverse Discrete Cosine Transform) 7 is performed on the DCT coefficients 2A of the host image and the DCT coefficients 2B of the signature image inserted into the DCT coefficients of the host image, thereby obtaining a watermarked image 8 in which only the host image is visible, while the signature image is not visible.

The signature image 4 watermarked on the host image 3 is decoded by a special decryption apparatus to then be restored. During restoration, IDCT is performed on a watermarked image, thereby extracting DCT coefficients thereof. Next, the extracted DCT coefficients 2A obtained by performing DCT on the original host image 3, are separated from the DCT coefficients of the watermarked image at subtractor 10, thereby extracting DCT coefficient components of the encoded signature image. Then, a decoder 11 decodes the DCT coefficient components of the encoded signature image. Here, the encryption decoder 11 performs a control operation for the decryption process. The DCT coefficients of the signature image decoded by the decryption control operation are again IDCT-performed 13, thereby restoring the signature image.

As described above, in the conventional digital image codec apparatus using watermarking, a conventional method for evaluating the quality of a transmitted image is performed by comparing the transmitted current image with the previous image in various ways. The conventional method is based on the assumption that the current image is not significantly different from the previous image. However, this assumption is not applied to an abruptly changing image screen. In this case, image evaluation is not accurately performed. Also, even if the assumption is proper, the image evaluation is less correct than in the case of a comparison with the original image.

SUMMARY OF THE INVENTION

It is a first object of the present invention to provide a digital image coding apparatus which can precisely estimate the quality of a host image by transmitting a small quantity of image samples, which are suitable for the application of an analysis of variance (ANOVA) technique, as a signature image using watermarking during encoding without affecting an original image, and by performing an ANOVA technique on the restored signature image and the original signature image during decoding.

To achieve the above object of the present invention, there is provided a digital image coding apparatus for recording a signature image on a host image using watermarking, including a first discrete wavelet transform portion for receiving a host image to be transmitted and performing discrete wavelet transform thereon, thereby outputting M×M discrete wavelet coefficients where M is a predetermined positive integer, an original signature image storage portion for storing an image, which is suitable to the performance of an analysis-of-variance (ANOVA) technique as an original signature image, a second discrete wavelet transform portion for receiving the original signature image and performing discrete wavelet transform thereon to obtain N×N wavelet coefficients, N being another predetermined integer smaller than M, and a coefficient replacement/combination portion for replacing and combining N×N location data with N×N wavelet coefficients selected among M×M wavelet coefficients in accordance with a predetermined rule to then output the N×N location data and replaced M×M wavelet coefficients.

Also, the digital image coding apparatus may further include an inverse discrete wavelet transform portion for performing inverse discrete wavelet transform on the replaced M×M wavelet coefficients to generate a combined host image.

Also, the digital image coding apparatus may further include a compression portion for compressing the combined host image and the N×N location data.

The predetermined positive integer N is preferably smaller than or equal to ⅛ of the predetermined positive integer M.

Also, the predetermined rule preferably is to select 50% of the upper significant wavelet coefficients among M×M wavelet coefficients.

According to another aspect of the present invention, there is provided a digital image decoding apparatus for receiving bitstreams having a signature image recorded on a host image using watermarking and for restoring the host image and the signature image, including a coefficient separating portion for separating N×N wavelet coefficients from the M×M wavelet coefficients using the N×N location data, M being a predetermined positive integer and N being another predetermined integer smaller than M, an inverse discrete wavelet transform portion for performing inverse discrete wavelet transform on the N×N wavelet coefficients to generate a restored signature image, an original signature image storage portion for storing the signature image, which is suitable to the performance of an ANOVA technique and which is the same as that used in watermarking of the host image as the original signature image, and an ANOVA portion for applying the original signature image and the restored signature image to an ANOVA technique to output variance characteristic data of the restored signature image as image quality indication data.

Also, the digital image decoding apparatus may further include a decompression portion for receiving the bitstreams having the combined host image and the N×N location data compressed therein, and decompressing the same to output the combined host image, and N×N location data representing the locations of signature image discrete wavelet coefficients, and a discrete wavelet transform portion for performing discrete wavelet transform on the combined host image to obtain M×M wavelet coefficients, M being a predetermined positive integer.

According to another aspect of the present invention, there is provided a digital image codec apparatus for recording a signature image on a host image using watermarking, and restoring the host image and the signature image, including: a first discrete wavelet transform portion for receiving a host image to be transmitted and performing discrete wavelet transform thereon, thereby outputting M×M discrete wavelet coefficients where M is a predetermined positive integer, a first original signature image storage portion for storing an image, which is suitable to the performance of an analysis of variance (ANOVA) technique, as an original signal image, a second discrete wavelet transform portion for receiving the original signature image and performing discrete wavelet transform thereon to obtain N×N wavelet coefficients, N being another predetermined integer smaller than M, a coefficient replacement/combination portion for replacing and combining N×N location data with N×N wavelet coefficients selected among M×M wavelet coefficients in accordance with a predetermined rule to then output the N×N location data and replaced M×M wavelet coefficients, a fist inverse discrete wavelet transform portion for performing inverse discrete wavelet transform on the replaced M×M wavelet coefficients to generate a combined host image, a compression portion for compressing the combined host image and the N×N location data, a decompression portion for receiving the bitstreams having the combined host image and the N×N location data compressed therein, and decompressing the same to output the combined host image, and N×N location data representing the locations of signature image discrete wavelet coefficients, a third discrete wavelet transform portion for performing discrete wavelet transform on the combined host image to obtain M×M wavelet coefficients, a coefficient separating portion for separating the N×N location data from the M×M wavelet coefficients using N×N wavelet coefficients, a second inverse discrete wavelet transform portion for performing inverse discrete wavelet transform on the N×N wavelet coefficients to generate a restored signature image, a second original signature image storage portion for storing the signature image, which is suitable to the performance of an ANOVA technique and which is the same as that used in watermarking of the host image as the original signature image, and an ANOVA portion for applying the original signature image and the restored signature image to an ANOVA technique to output variance characteristic data of the restored signature image as image quality indication data.

According to still further another aspect of the present invention, there is provided a digital image coding method for recording a signature image on a host image using watermarking, including the steps of: (a) performing discrete wavelet transform on a host image to be transmitted, thereby obtaining M×M discrete wavelet coefficients where M is a predetermined positive integer, (b) storing and supplying an image suitable to an ANOVA technique as an original signature image, (c) receiving the original signature image and performing discrete wavelet transform thereon, thereby obtaining N×N discrete wavelet coefficients where N is a predetermined positive integer smaller than M, (d) discriminating M×M discrete wavelet coefficients and selecting the N×N replacing locations having high significance according to a predetermined rule, (e) replacing and combining the coefficients of the selected N×N locations among M×M discrete wavelet coefficients with N×N wavelet coefficients, (f) performing inverse discrete wavelet transform on the replaced M×M wavelet coefficients to generate a combined host image, and (g) compressing the combined host image and the N×N location data.

According to yet another aspect of the present invention, there is provided a digital image decoding method for receiving bitstreams having a signature image recorded on a host image using watermarking, and restoring the signature image and the host image, including the steps of: (a) decompressing the received bitstreams, thereby obtaining a host image and N×N location data, (b) performing discrete wavelet transform on the host image, thereby obtaining M×M wavelet coefficients, (c) separating N×N wavelet coefficients corresponding to N×N location data, among M×M wavelet coefficients, (d) performing inverse discrete wavelet transform on the N×N wavelet coefficients, thereby restoring the signature image, (e) storing as the original signature image the signature image, which is suitable to the application of an ANOVA technique and which is the same as that used in watermarking of the host image during encoding, and (f) applying the original signature image and the restored signature image to an ANOVA technique to output variance characteristic data of the restored signature image as image quality indication data.

Finally, the invention comprises a program media having stored thereon a computer program embodying the foregoing methods.

BRIEF DESCRIPTION OF THE DRAWINGS

The above objective and advantages of the present invention will become more apparent by describing in detail a preferred embodiment thereof with reference to the attached drawings in which:

FIG. 3 is a flow chart showing the steps of a digital image coding method according to the present invention, and FIG. 4 is a flow chart showing the steps of a digital image decoding method according to the present invention.

DESCRIPTION OF THE PREFERRED EMBODIMENTS

Figure 1:
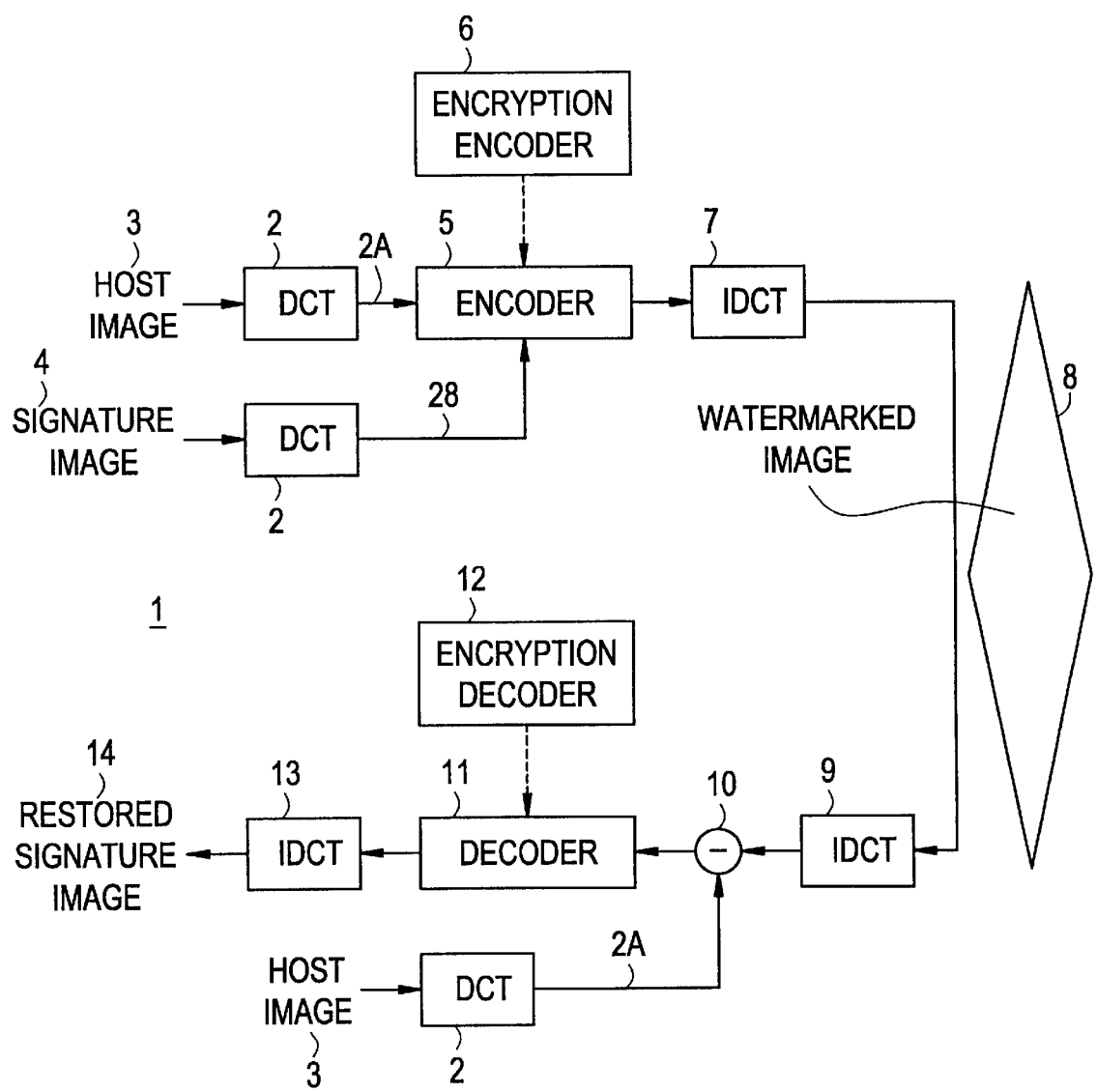
FIG. 1 is a conceptual block diagram illustrating a conventional digital image codec apparatus for generating a watermarked image and extracting a signature image from the watermarked image.
Figure 2:
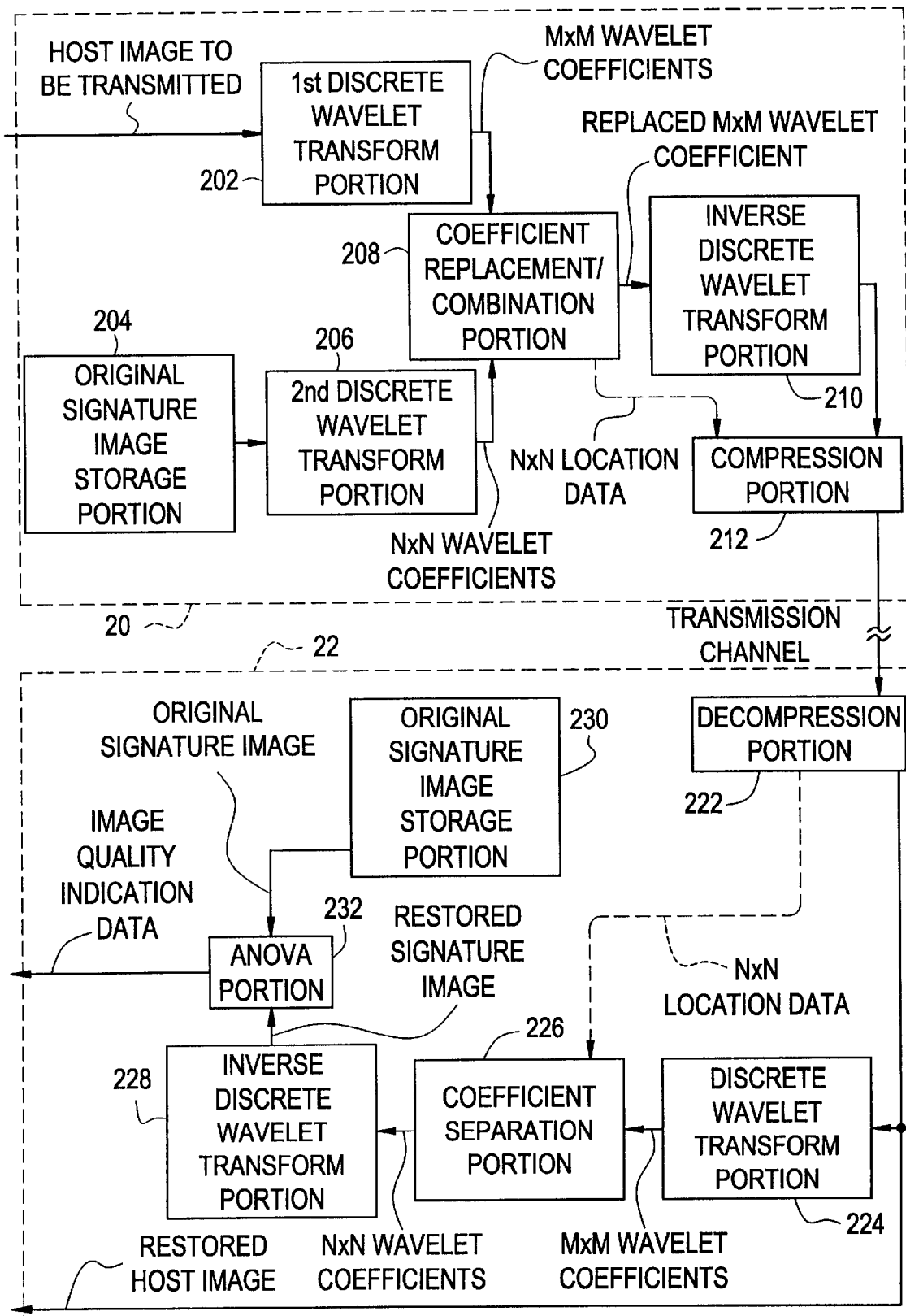
FIG. 2 is a block diagram illustrating a digital image codec apparatus according to the present invention.

Referring to FIG. 2, a digital image codec apparatus according to the present invention includes an encoding unit 20 and a decoding unit 22. The encoding unit 20 includes a first discrete wavelet transform portion 202, an original signature image storage portion 204, a second discrete wavelet transform portion 206, a coefficient replacement/combination portion 208, an inverse discrete wavelet transform portion 210 and a compression portion 212. Also, the decoding unit 22 includes a decompression portion 222, a discrete wavelet transform portion 224, a coefficient separating portion 226, an inverse discrete wavelet transform portion 228, an original signature image storage portion 230 and an ANOVA portion 232.

First, the operation of the encoding unit 20 will be described with reference to FIGS. 2 and 3.

The first discrete wavelet transform portion 202 receives a host image to be transmitted, and performs discrete wavelet transform (step 302) to obtain discrete wavelet coefficients. As known in the art, the discrete wavelet coefficients consist of a square matrix. In this embodiment, it is assumed that the discrete wavelet coefficients are M×M square matrix, M being a predetermined positive integer.

The original signature image storage portion 204 stores an image suitable to an analysis of variance (ANOVA) technique as an original signal image and supplies the same to the second discrete wavelet transform portion 206 (step 304). The image, which is suitable to the performance of ANOVA techniques, includes, for example, a mesh at regular intervals, a dot-type image and the like.

The second discrete wavelet transform portion 206 receives the original signature image from a storage 204 and performs discrete wavelet transform thereon (step 306) to obtain N×N wavelet coefficients, N being another predetermined integer smaller than M. Here, N is a constant value fixed for each image and is preferably less than or equal to ⅛ of M so as to suppress the influence on the original image.

The coefficient replacement/combination portion 208 replaces and combines N×N location data with N×N wavelet coefficients selected among M×M wavelet coefficients in accordance with a predetermined rule (step 310) to then output the N×N location data and replaced M×M wavelet coefficients. In order to evaluate the quality of the host image, significant coefficients qualified for representing the quality of the host image must be selected. Thus, in this embodiment, 50% of upper significant wavelet coefficients are selected among M×M wavelet coefficients, and N×N wavelet coefficients are selected among 50% of upper significant wavelet coefficients, in accordance with the predetermined rule, for example, at regular intervals.

The inverse discrete wavelet transform portion 210 performs inverse discrete wavelet transform on the replaced M×M wavelet coefficients to generate a combined host image (step 312).

The compression portion 212 compresses the combined host image and the N×N location data to then be transmitted via a transmission channel (step 314). In this embodiment, in embedding a signature image onto a host image by performing discrete wavelet transform, N is set to be smaller than M, that is, ⅛ of M. Thus, in view of inverse discrete wavelet transform characteristics, the combined host image is not significantly different from the original host image.

Therefore, the encoding unit 20 can write an original signature image capable of evaluating the quality of an original host image on the original host image in secrecy and can transmit the same, while not considerably affecting the original host image.

Now, the operation of the decoding unit 22 will be described with reference to FIGS. 2 and 4. The compressed bitstreams output from the encoding unit 20 and transmitted via the transmission channel are decoded by the decoding unit 22 as follows.

The decompression portion 222 receives the bitstreams having the combined host image and the N×N location data compressed therein, and decompresses the same (step 402) to output the combined host image and N×N location data representing the locations of a signature image discrete wavelet coefficients. Here, N is determined during encoding and is preferably ⅛ of M.

Next, a signature image is restored from the combined host image. That is to say, the discrete wavelet transform portion 224 performs discrete wavelet transform on the combined host image to obtain M×M wavelet coefficients, M being a predetermined positive integer (step 404).

The coefficient separating portion 226 separates N×N wavelet coefficients from the M×M wavelet coefficients using the M×M location data, M being a predetermined positive integer and N being another predetermined integer smaller than M (step 406).

The inverse discrete wavelet transform portion 228 performs inverse discrete wavelet transform on the N×N wavelet coefficients to generate a restored signature image.

The original signature image storage portion 230 stores the signature image, which is suitable to the performance of an ANOVA technique and which is the same as that used in watermarking of the host image, and supplies the original signature image to the ANOVA portion 232.

The ANOVA portion 232 applies the original signature image and the restored signature image to the ANOVA technique (step 410). As known to one skilled in the art, the ANOVA technique allows inspection for or estimation of such that variances of all measured values are divided into variances corresponding to several factors and other remainder error variances. That is to say, the ANOVA technique allows the variance characteristics of all images to be analyzed very closely with respect to the original signature image and the restored signature image. In such a manner, the ANOVA portion 232 obtains image quality indication data depending on the variance characteristics and outputs the same.

Here, the restored signature image is obtained by replacing the significant coefficients among the wavelet coefficients of the host image with the wavelet coefficients of the original signature image. Also, since the restored signature image is compared with its original image, the quality of the signature image can be very accurately evaluated. Thus, the quality of the restored signature image is almost corresponding to that of the host image.

As described above, according to the present invention, during encoding, a small amount of image samples are transmitted in confidence as a signature image using watermarking, without affecting the original images. Then, during decoding, ANOVA technique is applied to the restored signature image and the original signature image, thereby accurately predicting the quality of the host image.

The digital image coding and decoding methods disclosed herein can be embodied in and performed using a computer program. Also, the methods can be implemented by a generaluse digital computer for operating a program on a storage media, where the storage employs any of electronic, magnetic or optical media conventionally used to permit access to the program by the computer. In particular, the medium may include a magnetic recording medium such as a floppy disk or a hard disk, and an optical recording medium such as a CD-ROM or a DVD. Also, such functional programs, codes and code segments can be easily generated by a programmer in the art to which the present invention is pertinent, without the use of undue experimentation.

While the present invention has been described in accordance with certain preferred embodiments, it is not limited thereto, and the applicant intends to obtain protection for the full scope of the invention as defined by the appended claims, in accordance with applicable law.

What is claimed is:

1. A digital image coding apparatus for recording a signature image on a host image using watermarking, comprising:

a first discrete wavelet transform portion operative to receive a host image to be transmitted and perform a discrete wavelet transform thereon, thereby outputting M×M discrete wavelet coefficients where M is a predetermined positive integer;

an original signature image storage portion operative to store an image, which is suitable to performance of an analysis of variance (ANOVA) technique, as an original signature image;

a second discrete wavelet transform portion operative to receive the original signature image and perform a discrete wavelet transform thereon to obtain N×N wavelet coefficients, N being another predetermined integer smaller than M; and a coefficient replacement/combination portion operative to replace and combine N×N location data with M×M wavelet coefficients selected among M×M wavelet coefficients in accordance with a predetermined rule to then output the N×N location data and replaced M×M wavelet coefficients.

2. The digital image coding apparatus according to claim 1, further comprising an inverse discrete wavelet transform portion operative to perform an inverse discrete wavelet transform on the replaced M×M wavelet coefficients to generate a combined host image.

3. The digital image coding apparatus according to claim 2, further comprising a compression portion operative to compress the combined host image and the N×N location data.

4. The digital image coding apparatus according to claim 1, wherein the predetermined positive integer N is smaller than or equal to ⅛ of the predetermined positive integer M.

5. The digital image coding apparatus according to claim 1, wherein the predetermined rule is to select 50% of the upper significant wavelet coefficients among M×M wavelet coefficients.

6. A digital image decoding apparatus operative to receive bitstreams having a signature image recorded on a host image using watermarking and to restore the host image and the signature image, comprising:

a coefficient separating portion operative to separate wavelet coefficients from the M×M wavelet coefficients using the N×N location data, M being a predetermined positive integer and N being another predetermined integer smaller than M;

an inverse discrete wavelet transform portion for performing an inverse discrete wavelet transform on the N×N wavelet coefficients to generate a restored signature image;

an original signature image storage portion operative to store a signature image, which is suitable for performance of an ANOVA technique and which is the same as that used in watermarking of the host image, as the original signature image; and an ANOVA portion operative to apply the original signature image and the restored signature image to an ANOVA technique to output variance characteristic data of the restored signature image as image quality indication data.

7. The digital image decoding apparatus according to claim 6, further comprising:

a decompression portion operative to receive the bitstreams having the combined host image and the N×N location data compressed therein, and decompressing the same to output the combined host image, and N×N location data representing the locations of signature image discrete wavelet coefficients; and a discrete wavelet transform portion operative to perform discrete wavelet transform on the combined host image to obtain M×M wavelet coefficients, M being a predetermined positive integer.

8. The digital image decoding apparatus according to claim 6, wherein the predetermined positive integer N is smaller than or equal to ⅛ of the predetermined positive integer M.

9. A digital image codec apparatus for recording a signature image on a host image using watermarking, and restoring the host image and the signature image, comprising:

a first discrete wavelet transform portion operative to receive a host image to be transmitted and perform a discrete wavelet transform thereon, thereby outputting M×M discrete wavelet coefficients where M is a predetermined positive integer;

a first original signature image storage portion operative to store an image suitable to an analysis of variance (ANOVA) technique as an original signal image;

a second discrete wavelet transform portion operative to receive the original signature image and perform a discrete wavelet transform thereon to obtain N×N wavelet coefficients, N being another predetermined integer smaller than M; a coefficient replacement/ combination portion for replacing and combining N×N location data with N×N wavelet coefficients selected among M×M wavelet coefficients in accordance with a predetermined rule to then output the N×N location data and replaced M×M wavelet coefficients;

a fist inverse discrete wavelet transform portion operative to perform an inverse discrete wavelet transform on the replaced M×M wavelet coefficients to generate a combined host image;

a compression portion for compressing the combined host image and the N×N location data;

a decompression portion operative to receive the bitstreams having the combined host image and the N×N location data compressed therein, and decompress the same to output the combined host image, and N×N location data representing the locations of signature image discrete wavelet coefficients;

a third discrete wavelet transform portion operative to perform a discrete wavelet transform on the combined host image to obtain M×M wavelet coefficients;

a coefficient separating portion operative to separate the N×N location data from the M×M wavelet coefficients using N×N wavelet coefficients;

a second inverse discrete wavelet transform portion operative to perform an inverse discrete wavelet transform on the N×N wavelet coefficients to generate a restored signature image;

a second original signature image storage portion operative to store the signature image suitable to an ANOVA technique and which is the same as that used in watermarking of the host image as the original signature image; and an ANOVA portion operative to apply the original signature image and the restored signature image to an ANOVA technique and to output variance characteristic data of the restored signature image as image quality indication data.

10. A digital image coding method for recording a signature image on a host image using watermarking, comprising the steps of:

(a) performing a discrete wavelet transform on a host image to be transmitted, thereby obtaining M×M discrete wavelet coefficients where M is a predetermined positive integer;

(b) storing and supplying an image suitable to an ANOVA technique as an original signature image;

(c) receiving the original signature image and performing discrete wavelet transform thereon, thereby obtaining N×N discrete wavelet coefficients where N is a predetermined positive integer smaller than M;

(d) discriminating M×M discrete wavelet coefficients and selecting the N×N replacing locations having high significance according to a predetermined rule;

(e) replacing and combining the coefficients of the selected N×N locations among M×M discrete wavelet coefficients with N×N wavelet coefficients;

(f) performing an inverse discrete wavelet transform on the replaced M×M wavelet coefficients to generate a combined host image; and (g) compressing the combined host image and the N×N location data.

11. The digital image coding method according to claim 10, wherein in step (d), the predetermined positive integer N is smaller than or equal to ⅛ of the predetermined positive integer M.

12. The digital image coding method according to claim 10, wherein in step (d), the predetermined rule is to select 50% of the upper significant wavelet coefficients among M×M wavelet coefficients and to select N×N location data among 50% of the upper significant wavelet coefficients at regular intervals.

13. A digital image decoding method for receiving bitstreams having a signature image recorded on a host image using watermarking, and restoring the signature image and the host image, comprising the steps of:

(a) decompressing the received bitstreams, thereby obtaining a host image and N×N location data;

(b) performing a discrete wavelet transform on the host image, thereby obtaining M×M wavelet coefficients;

(c) separating N×N wavelet coefficients corresponding to N×N location data, among M×M wavelet coefficients;

(d) performing an inverse discrete wavelet transform on the N×N wavelet coefficients, thereby restoring the signature image;

(e) storing as the original signature image the signature image suitable to an ANOVA technique and which is the same as that used in watermarking of the host image during encoding; and (f) applying the original signature image and the restored signature image to an ANOVA technique to output variance characteristic data of the restored signature image as image quality indication data.

14. A program media containing a computer program for executing a digital image coding method using watermarking, the method being for recording a signature image on a host image using watermarking, comprising the steps of:

(a) performing a discrete wavelet transform on a host image to be transmitted, thereby obtaining M×M discrete wavelet coefficients where M is a predetermined positive integer;

(b) storing and supplying an image suitable to an ANOVA technique as an original signature image;

(c) receiving the original signature image and performing a discrete wavelet transform thereon, thereby obtaining N×N discrete wavelet coefficients where N is a predetermined positive integer smaller than M;

(d) discriminating M×M discrete wavelet coefficients and selecting the N×N replacing locations having high significance according to a predetermined rule;

(e) replacing and combining the coefficients of the selected N×N locations among M×M discrete wavelet coefficients with N×N wavelet coefficients;

(f) performing an inverse discrete wavelet transform on the replaced M×M wavelet coefficients to generate a combined host image; and (g) compressing the combined host image and the N×N location data.

15. The program media having a digital image coding method according to claim 14, wherein in step (d), the predetermined positive integer N is smaller than or equal to ⅛ of the predetermined positive integer M.

16. The program media having a digital image coding method according to claim 14, wherein in step (d), the predetermined rule is to select 50% of the upper significant wavelet coefficients among M×M wavelet coefficients and to select N×N location data among 50% of the upper significant wavelet coefficients at regular intervals.

17. A program media containing a computer program for executing a digital image coding method using watermarking, the method being for receiving bitstreams having a signature image recorded on a host image using watermarking, and restoring the signature image and the host image, comprising the steps of:

(a) decompressing the received bitstreams, thereby obtaining a host image and N×N location data;

(b) performing a discrete wavelet transform on the host image, thereby obtaining M×M wavelet coefficients;

(c) separating N×N wavelet coefficients corresponding to N×N location data, among M×M wavelet coefficients;

(d) performing an inverse discrete wavelet transform on the N×N wavelet coefficients, thereby restoring the signature image;

(e) storing as the original signature image the signature image suitable to an ANOVA technique and which is the same as that used in watermarking of the host image during encoding; and (f) applying the original signature image and the restored signature image to an ANOVA technique to output variance characteristic data of the restored signature image as image quality indication data.

* * * * *